United States Patent
Haseda

(10) Patent No.: US 12,194,703 B2
(45) Date of Patent: Jan. 14, 2025

(54) METHOD FOR MANUFACTURING PNEUMATIC TIRE

(71) Applicant: Toyo Tire Corporation, Itami (JP)

(72) Inventor: Hiroyuki Haseda, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 41 days.

(21) Appl. No.: 18/072,808

(22) Filed: Dec. 1, 2022

(65) Prior Publication Data

US 2023/0191734 A1    Jun. 22, 2023

(30) Foreign Application Priority Data

Dec. 21, 2021    (JP) .................................. 2021-206984

(51) Int. Cl.
*B29D 30/48*    (2006.01)

(52) U.S. Cl.
CPC ........ *B29D 30/48* (2013.01); *B29D 2030/481* (2013.01); *B29D 2030/482* (2013.01)

(58) Field of Classification Search
CPC .............. B29D 30/48; B29D 2030/481; B29D 2030/482; B29D 2030/487
USPC ........................................................ 156/136
See application file for complete search history.

(56) References Cited

U.S. PATENT DOCUMENTS

2007/0272345 A1 * 11/2007 Sawada .................. B29D 30/32
                                                                 156/131
2020/0130307 A1 *  4/2020 Kodama ............... B29C 48/022

FOREIGN PATENT DOCUMENTS

JP    2003191346 A  *  7/2003
JP    2010228343 A  * 10/2010
JP    2021-91162 A     6/2021

OTHER PUBLICATIONS

Miyamoto A, JP-2010228343-A, machine translation. (Year: 2010).*
Takagi S, JP-2003191346-A, machine translation. (Year: 2003).*

* cited by examiner

*Primary Examiner* — Sedef E Paquette
(74) *Attorney, Agent, or Firm* — WHDA, LLP

(57)    ABSTRACT

A method for manufacturing pneumatic tire of the present disclosure, the method comprising: a first step of pressure-bonding a bead filler to an outer peripheral portion of an annular bead core, the bead filler being thinned outward of the bead core in a radial direction, and fabricating an annular bead member; a second step of causing a separator to support the bead filler, and mounting the bead member so that the radial direction of the bead core goes along a horizontal direction; and a third step of cooling the bead member.

13 Claims, 5 Drawing Sheets

METHOD FOR MANUFACTURING PNEUMATIC TIRE

CROSS-REFERENCE TO RELATED APPLICATIONS

The present application claims priority of Japanese Patent Application No. 2021-206984 filed on Dec. 21, 2021, the content of which is incorporated herein by reference.

BACKGROUND OF THE INVENTION

Field of the Invention

The present disclosure relates to method for manufacturing a pneumatic tire.

Description of the Related Art

A pneumatic tire includes annular bead members embedded in bead portions. The bead members are fabricated by pressure-bonding bead fillers, which are formed into a substantially triangular shape in cross section, to outer peripheral portions of annular bead cores. In Patent Document 1, each of the fabricated bead members causes a separator to support one side surface portion of the bead filler, and is erected so that a radial direction of the bead core goes along an up-and-down direction. The separator is caused to support the one side surface portion of the bead filler, whereby the bead filler is prevented from falling toward the one surface side portion.

However, when the bead member is cooled in an erected state, the bead filler may be deformed due to heat shrink to be peeled off from the separator, and the bead filler may fall toward the other side surface portion that is not supported by the separator.

PRIOR ART DOCUMENT

Patent Document

Patent Document 1: JP-A-2021-91162

SUMMARY OF THE INVENTION

It is an object of the present disclosure to provide a method for manufacturing a pneumatic tire, which prevents the bead fillers from falling when the bead members are cooled.

A method for manufacturing pneumatic tire of the present disclosure, the method comprising: a first step of pressure-bonding a bead filler to an outer peripheral portion of an annular bead core, the bead filler being thinned outward of the bead core in a radial direction, and fabricating an annular bead member; a second step of causing a separator to support the bead filler, and mounting the bead member so that the radial direction of the bead core goes along a horizontal direction; and a third step of cooling the bead member.

PNEUMATIC TIRE

Figure 1:
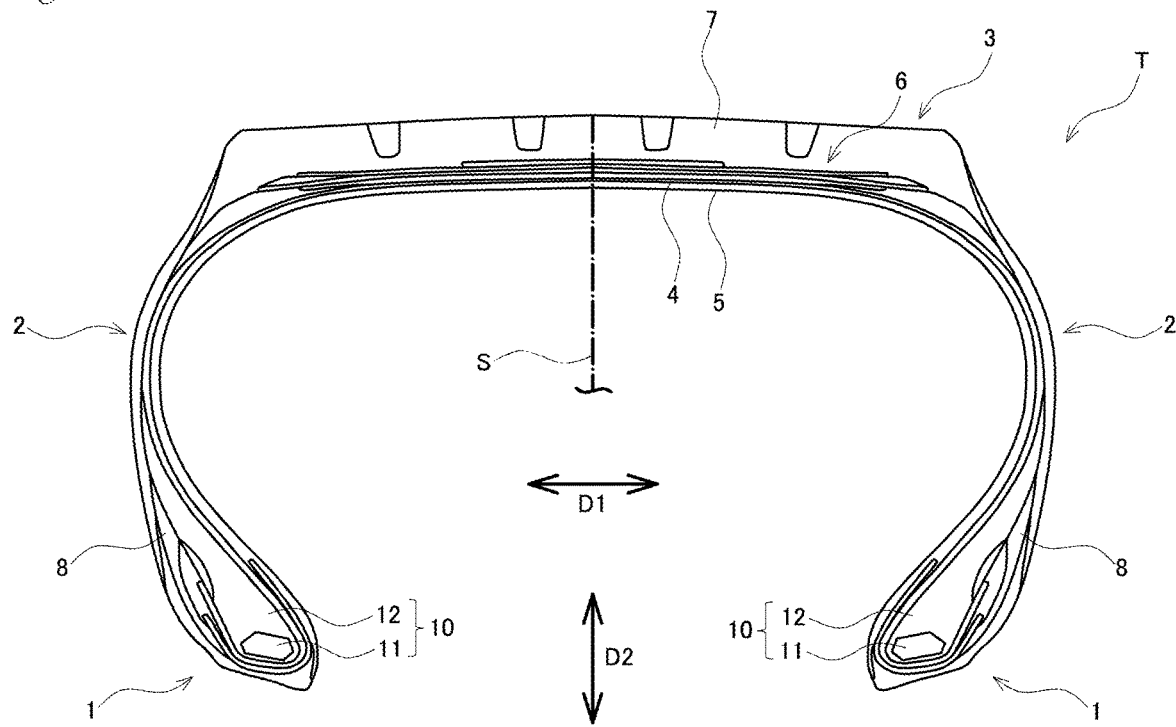
FIG. 1 is a cross-sectional view of a tire meridian plane, illustrating an example of a pneumatic tire.

Hereinafter, an embodiment of a pneumatic tire will be described with reference to FIG. 1. Note that a dimensional ratio of the drawing does not necessarily coincide with an actual dimensional ratio in each of the drawings, and dimensional ratios in the respective drawings do not necessarily coincide with each other (FIGS. 2 through 7 as well).

In FIG. 1, a first direction D1 indicates a tire axial direction D1 parallel to a tire rotation axis of a pneumatic tire (hereinafter, also simply referred to as a "tire") T, and a second direction D2 indicates a tire radial direction D2 that is a diameter direction of the tire T. In the tire radial direction D2, an inner side indicates a side close to the tire rotation axis, and an outer side indicates a side far from the tire rotation axis. A tire equatorial plane S is a plane orthogonal to the tire rotation axis and located at the center of the tire T in the tire axial direction D1, and a tire meridian plane is a plane including the tire rotation axis and orthogonal to the tire equatorial plane S.

As illustrated in FIG. 1, the tire T includes: a pair of bead portions 1 and 1; a pair of sidewalls 2 and 2 extending outward in the tire radial direction D2 from the pair of respective bead portions 1 and 1; and a tread 3 continuous with outer ends of the pair of respective sidewalls 2 and 2 in the tire radial direction D2.

Between the pair of bead portions 1 and 1, a carcass ply 4 is stretched over the sidewalls 2 and the tread 3. On an inner circumferential side of the carcass ply 4, an inner liner 5 for holding an air pressure is disposed. In the tread 3, on the outside of the carcass ply 4 in the tire radial direction D2, a belt layer 6 is disposed. On the outside of the tread 3 in the tire radial direction D2, a tread rubber 7 is disposed, and has a tread pattern formed thereon.

In each of the bead portions 1, an annular bead core 11 is embedded, and a bead filler 12 is disposed on the outside of the bead core 11 in the tire radial direction D2. A member formed by integrating the bead core 11 and the bead filler 12 with each other is referred to as a bead member 10. Between the bead filler 12 and the sidewall 2, a chafer pad 8 is disposed.

<Method for Manufacturing Pneumatic Tire>

Next, a description will be given of a method for manufacturing a pneumatic tire according to the present embodiment with reference to FIGS. 2 to 7.

The tire T of FIG. 1 is manufactured by a tire constituent member fabrication process, a green tire fabrication process, and a tire vulcanization process. The tire constituent member fabrication process is a process for fabricating a tread rubber, sidewall rubbers, a carcass ply, an inner liner, a belt, the bead members 10, and the like, which are tire constituent members. The green tire fabrication process is a process for fabricating a green tire by assembling the above-described tire constituent members on a molding drum. The tire vulcanization process is a process for manufacturing a vulcanized tire by vulcanizing the above-described green tire by a vulcanizing mold.

A tire manufacturing method (tire constituent member fabrication process) includes first to third steps for fabricating the bead members 10. In the present embodiment, the tire manufacturing method includes a fourth step of erecting the bead members 10, but is not limited to this.

[First Step]

Figure 2:
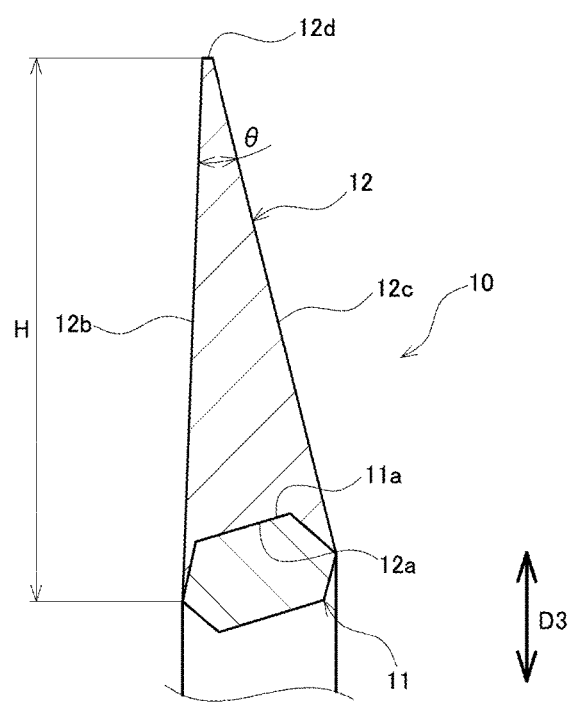
FIG. 2 is a cross-sectional view of a bead member.

As illustrated in FIG. 2, the first step fabricates each of the bead members 10 by pressure-bonding a bottom portion 12a of the bead filler 12 to an outer peripheral portion 11a of the bead core 11.

In FIG. 2 (also in FIGS. 3A to 5 and 7), a third direction D3 indicates a radial direction D3 of the bead core 11. In the radial direction D3 of the bead core 11, an inside indicates a side close to the center of the bead core 11, and an outside indicates a side (bead filler 12 side) far from the center of the bead core 11. The radial direction D3 may be the same direction as the tire radial direction D2.

The bead core 11 is an annular member formed by coating with rubber a convergent body (not shown) of steel wires and the like. The bead core 11 is formed into a polygonal shape in cross section. In the present embodiment, the bead core 11 is formed into a hexagonal shape in cross section. The bead core 11 is inclined with respect to a direction orthogonal to the radial direction D3. Specifically, the bead core 11 is inclined inward in the tire radial direction D2 from an outer end of the bead core 11 in the tire axial direction D1 toward an inner end thereof (see FIG. 1). Note that the bead core 11 is not limited to the above-described one.

The bead filler 12 is an annular member formed of hard rubber. The bead filler 12 is formed into a triangular shape in cross section, and has a thickness thinned outward of the bead core 11 in the radial direction D3. The bead filler 12 includes: a bottom portion 12a pressure-bonded to the bead core 11; a first side surface portion 12b and a second side surface portion 12c, which extend outward from the bottom portion 12a along the radial direction D3; and a tip end portion 12d located on an outer end thereof in the radial direction D3. The bottom portion 12a is formed into a recessed shape that goes along the outer peripheral portion 11a of the bead core 11.

From a viewpoint of suppressing air entry between the bead filler 12 and the carcass ply 4 (see FIG. 1) in the green tire fabrication process, preferably, the first side surface portion 12b is disposed in the inside in the tire axial direction D1, and the second side surface portion 12c is disposed on the outside in the tire axial direction D1. In the present embodiment, the first side surface portion 12b and the second side surface portion 12c are formed into a linear shape, but are not limited to this. For example, the first side surface portion 12b and the second side surface portion 12c may be formed into a shape curved to be recessed or to protrude.

Preferably, a height H of the bead filler 12 is 80 mm or more. Thus, the chafer pad 8 of FIG. 1 can be made small. As a result, in the green tire fabrication process, a band member including the carcass ply and such chafer pads can be rolled up easily, and air can be suppressed from entering between the bead filler 12 and other members. The height H is a dimension from an inner end of the bottom portion 12a in the radial direction D3 to the tip end portion 12d. From the viewpoint of suppressing the air entry to the green tire in the green tire fabrication process, preferably, an angle θ of the tip end portion 12d is 16 degrees or less. Note that the bead filler 12 is not limited to the above-described one.

Preferably, the bead core 11 and the bead filler 12 are pressure-bonded to each other in a state where a temperature difference between the bottom portion 12a and tip end portion 12d of the bead filler 12 is 25° C. or less. The temperature difference between the bottom portion 12a and the tip end portion 12d is reduced, whereby a rigidity difference therebetween can be reduced. Thus, the bead filler 12 can be suppressed from falling after being pressure-bonded to the bead core 11.

Moreover, preferably, the bead core 11 and the bead filler 12 are pressure-bonded to each other in a state in which the temperature of the tip end portion 12d of the bead filler 12 is 39° C. or more. The temperature of the tip end portion 12d is raised, whereby the rigidity difference due to the temperature difference between the bottom portion 12a and the tip end portion 12d can be reduced. Thus, the bead filler 12 can be suppressed from falling after being pressure-bonded to the bead core 11. The temperature of the tip end portion 12d of the bead filler 12 when the bead filler 12 is pressure-bonded is more preferably 40° C. or more, still more preferably 43 to 70° C.

Figure 3A:
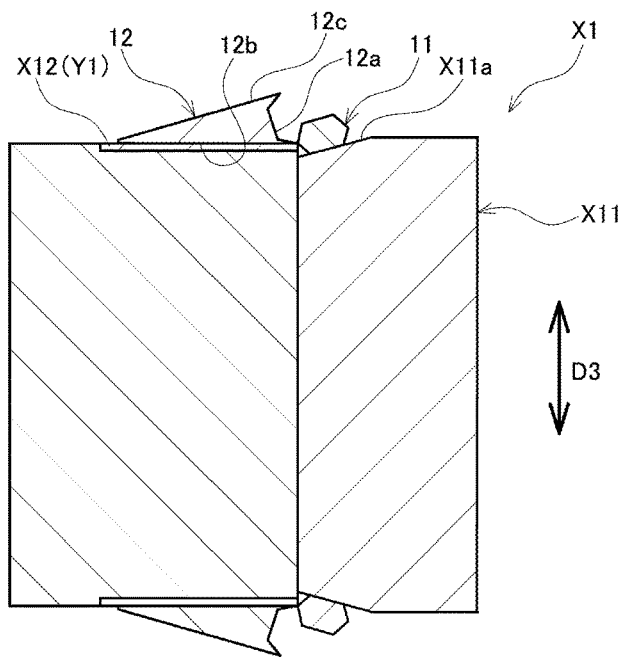
FIG. 3A is a schematic cross-sectional view illustrating a pressure-bonding device before pressure-bonding.
Figure 3B:
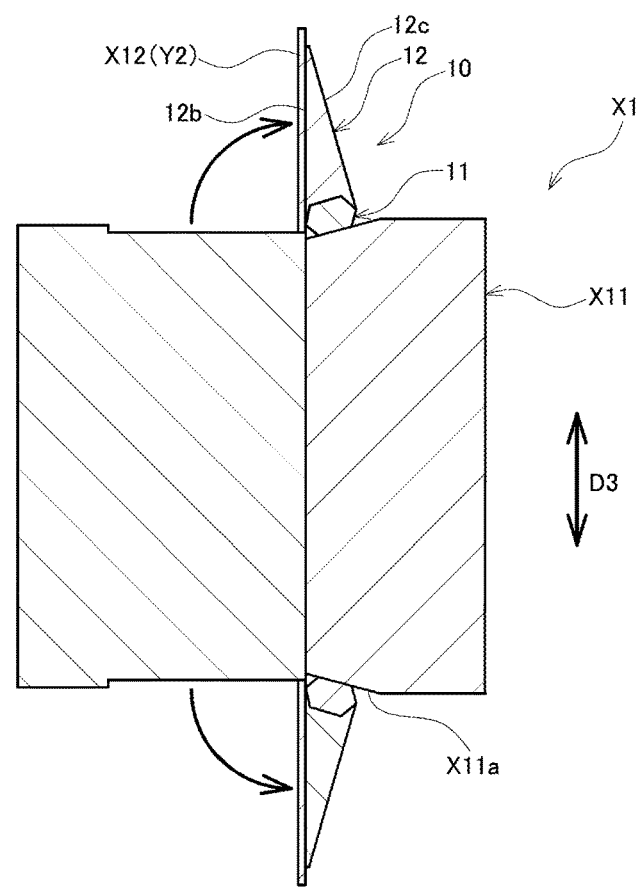
FIG. 3B is a schematic cross-sectional view illustrating the pressure-bonding device after the pressure-bonding.

As illustrated in FIGS. 3A and 3B, in the present embodiment, the bead core 11 and the bead filler 12 are pressure-bonded to each other using a pressure-bonding device X1. The pressure-bonding device X1 includes: a core support member X11 having a substantially cylindrical support surface X11a that supports the bead core 11; and a plurality of filler support members X12 which support the bead filler 12. The plurality of filler support members X12 are arranged cylindrically. The filler support members X12 are rotatable to a first position Y1 that goes along an axial direction of the core support member X11 and to a second position Y2 that goes along a direction orthogonal to the axial direction. In the present embodiment, the support surface X11a of the core support member X11 is inclined with respect to a central axis of the core support member X11, but is not limited to this.

The pressure bonding of the bead core 11 and the bead filler 12, which uses the pressure-bonding device X1, will be described with reference to FIGS. 3A and 3B.

First, as illustrated in FIG. 3A, the annular bead core 11 is disposed on the support surface X11a of the core support member X11. The bead core 11 is transferred to and disposed on the support surface X11a, for example, by a robot arm. Then, a rubber member subjected to extrusion molding is wound around outer peripheries of the filler support members X12 located at the first position Y1, and the bead filler 12 that is annular is formed. At this time, the first side surface portion 12b (which may also be the second side surface portion 12c) of the bead filler 12 is supported by the filler support members X12, and is disposed so that a thickness direction of the bead filler 12 goes along the radial direction D3 of the bead core 11. The bottom portion 12a of the bead filler 12 is disposed at a position that is in contact with or close to the bead core 11.

Next, as illustrated in FIG. 3B, the filler support members X12 are rotated to the second position Y2, and the bead filler 12 is turned up, whereby the bead filler 12 is pressure-bonded to the bead core 11. Thus, the annular bead member 10 is fabricated.

Note that the filler support members X12 may be a bladder that is a rubber bag-shaped member. In this case, the bladder is expanded, whereby the bead filler 12 can be turned up.

<Second Step>

Figure 4:
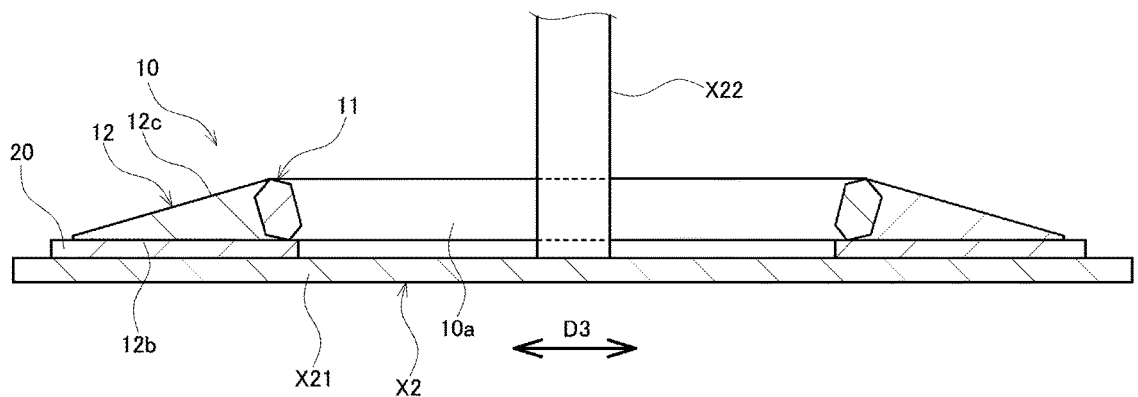
FIG. 4 is a cross-sectional view illustrating a mounted state of the bead members.

As illustrated in FIG. 4, the second step causes a separator 20 to support (paste) the bead filler 12 (thereto), and mounts the bead member 10 so that the radial direction D3 of the bead core 11 goes along the horizontal direction. At this time, (for example, on a mounting member X2) the bead member 10 is mounted so that the separator 20 that supports the bead filler 12 is located on a lower side (that the bead filler 12 is located on an upper side).

In the present embodiment, the bead member 10 fabricated in the first step is mounted on the separator 20 mounted first. Thus, the first side surface portion 12b can be pasted to the separator 20 by self weight of the bead filler 12, and work of pressing the bead filler 12 and pasting the same to the separator 20 can be omitted. The bead member 10 and the separator 20 are transferred and mounted, for example, by a robot arm. Note that, not being limited to the above, but the bead member 10 may be mounted on the separator 20, for example, after causing the separator 20 to support (paste) the first side surface portion 12b of the bead filler 12 (thereto).

The fabrication of the bead member 10 in the first step and the pasting of the bead member 10 to the separator 20 in the second step are performed in different steps, whereby, in comparison with the case where these are performed in the same step, the bead filler 12 can be prevented from being pasted tightly to the separator 20. Thus, workability of peeling off the bead filler 12 from the separator 20 can be improved.

Figure 5:
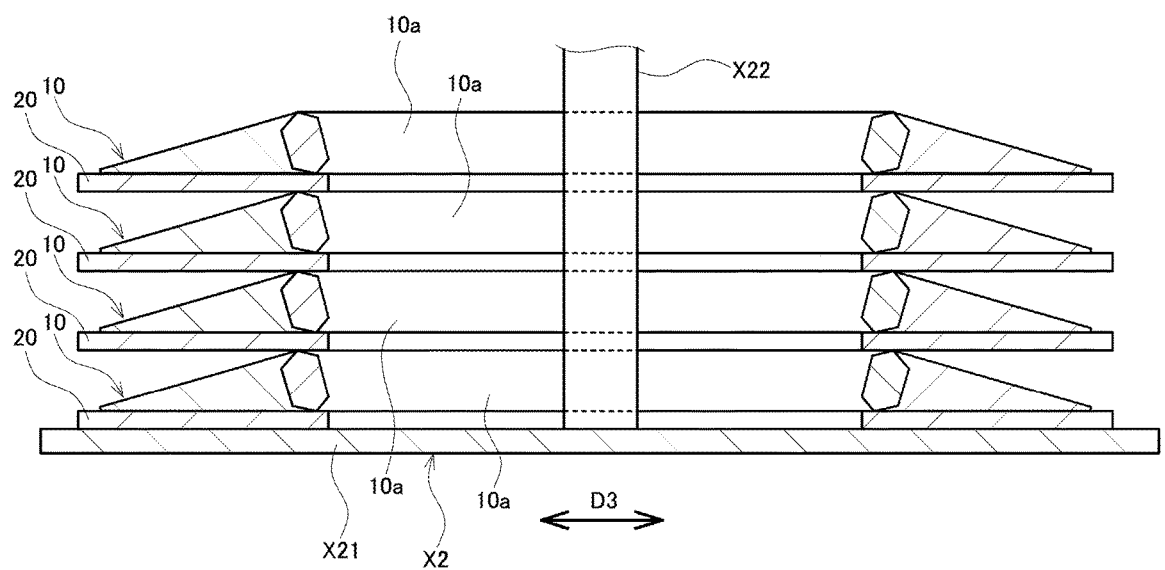
FIG. 5 is a cross-sectional view illustrating a mounted state of the stacked bead members.

In the present embodiment, as illustrated in FIG. 5, a plurality of the bead members 10, each of which is supported by the separator 20, are stacked and mounted on one another in the up-and-down direction. That is, the separators 20 and the bead members 10 are alternately mounted and stacked on one another, but are not limited to this. Preferably, the number of stacked bead members 10 is eight to ten. The number of bead members 10 is set to eight or more, whereby a cooling time of the bead members 10 in the third step to be described later can be ensured. The number of bead members 10 is set to ten or less, whereby such a phenomenon can be suppressed where, due to weight of the bead members 10 and the separators 20, which are stacked on one another, the bead members 10 (bead fillers 12) located on the lower side are tightly pasted to the separators 20, and the bead fillers 12 become difficult to peel off from the separators 20.

Each of the separators 20 is an annular plate-shaped member having a substantially constant thickness (for example, 5 mm). An outer diameter of the separator 20 is larger than an outer diameter of the bead member 10. Preferably, an inner diameter of the separator 20 is substantially the same as an inner diameter of the bead member 10 (bead core 11), which is supported by the separator 20, in order to hang the bead member 10 on a columnar member X22 to be described later. From a viewpoint of reducing weight and cost, preferably, the separator 20 is formed of resin.

Preferably, flexural strength of the separator 20 is 3 MPa to 20 MPa. The flexural strength is set to 3 MPa or more, whereby rigidity of the separator 20 can be ensured, and the bead filler 12 that supports the separator 20 can be suppressed from falling. The flexural strength is set to 20 MPa or less, whereby the bead filler 12 can be peeled off by bending the separator 20, and the workability of peeling off the bead filler 12 from the separator 20 can be improved. Note that the separator 20 is not limited to the above-described one.

The mounting member X2 includes: a flat plate member X21; and the columnar member X22 extending upward from the mounting member X2 (flat plate member X21). In the present embodiment, the flat plate member X21 is polygonal, and the columnar member X22 is cylindrical, but is not limited to this. Preferably, a width and length of the flat plate member X21 are larger than the outer diameter of the separator 20. A height of the columnar member X22 is appropriately set on the basis of the number of stacked bead members 10, a thickness of each thereof, and the thickness of each of the separators 20. The bead members 10 allow insertion of the columnar member X22 into opening portions 10a of the bead members 10, and are mounted on the flat plate member X21.

<Third Step>

The third step cools each of the bead members 10. Preferably, the bead member 10 is cooled to a substantial room temperature (room temperature±2 degrees centigrade Celsius) that is a predetermined temperature. In the present embodiment, the bead member 10 is subjected to natural cooling for 15 minutes or more, but is not limited to this. For example, the bead member 10 may be cooled by a cooling device (for example, a blower or the like) for less than 15 minutes. In the case of using the cooling device, it is preferable to cool the bottom portion 12a of the bead filler 12, whose temperature is high. In the present embodiment, the bead member 10 is cooled in a state of being mounted on the mounting member X2.

Figure 6:
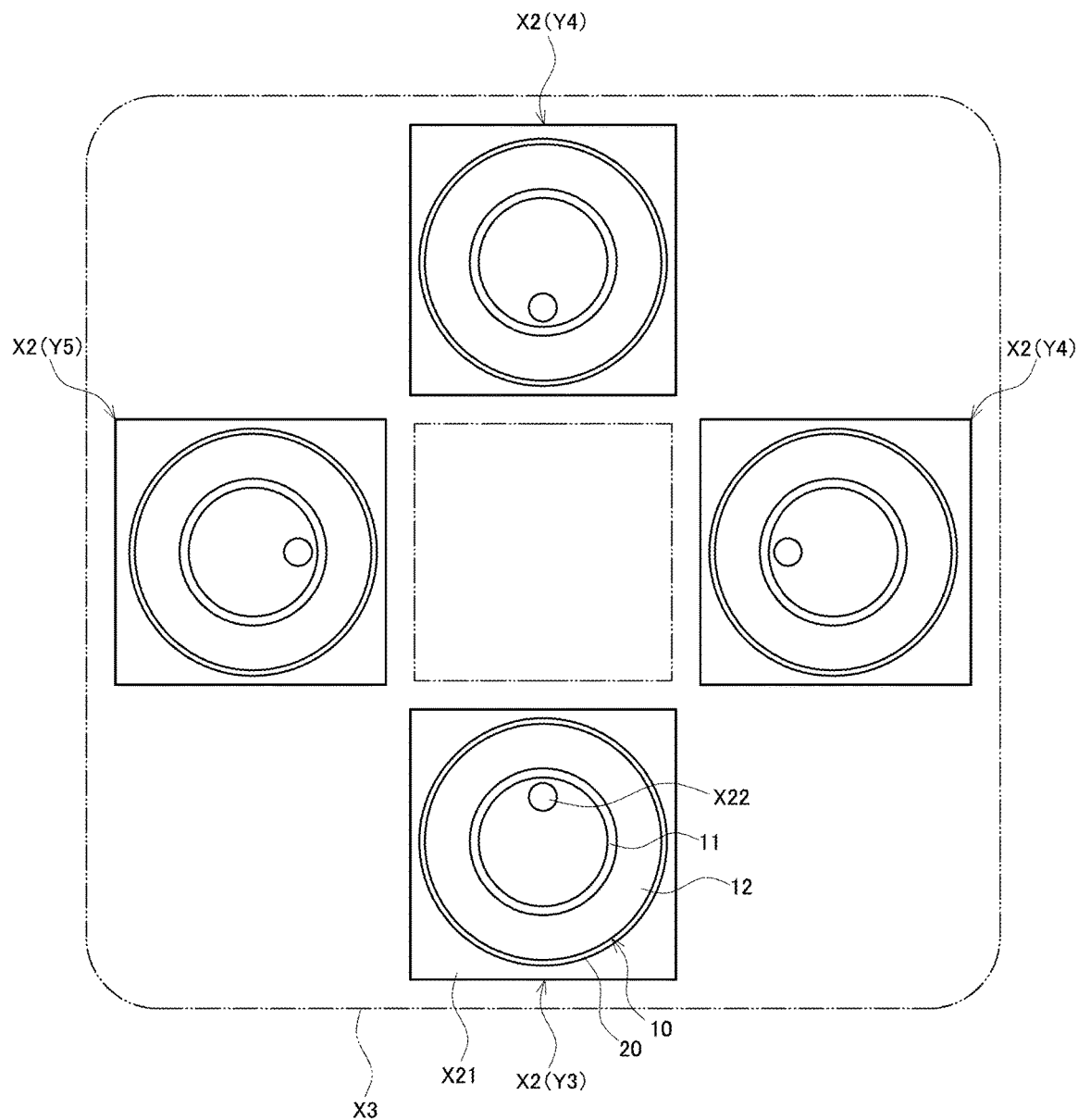
FIG. 6 is a plan view illustrating an example of a step of cooling the bead members.

As illustrated in FIG. 6, by a conveying device X3 (for example, a conveyor or the like), the mounting member X2 is sequentially transferred to a mounting position Y3 in the second step, a cooling position Y4 in the third step, and a rotation position Y5 in the fourth step to be described later. The mounting member X2 conveyed to the rotation position Y5 is conveyed to the mounting position Y3 again after being emptied. The conveying device X3 stops for a predetermined time until a predetermined number of the bead members 10 are mounted on the mounting member X2 at the mounting position Y3.

In the present embodiment, a plurality (for example, four) of the mounting members X2 are arranged on the conveying device X3. Thus, after the predetermined number of bead members 10 are mounted on the mounting member X2, the bead members 10 can be mounted on another mounting member X2 without stopping the fabrication of the bead members 10. Moreover, a cooling time of the bead members 10 on the conveying device X3 (the mounting members X2) can be ensured. The number of arranged mounting members X2 is appropriately set on the basis of the cooling time of the bead members 10, the number of stacked bead members 10, and the like.

<Fourth Step>

Figure 7:
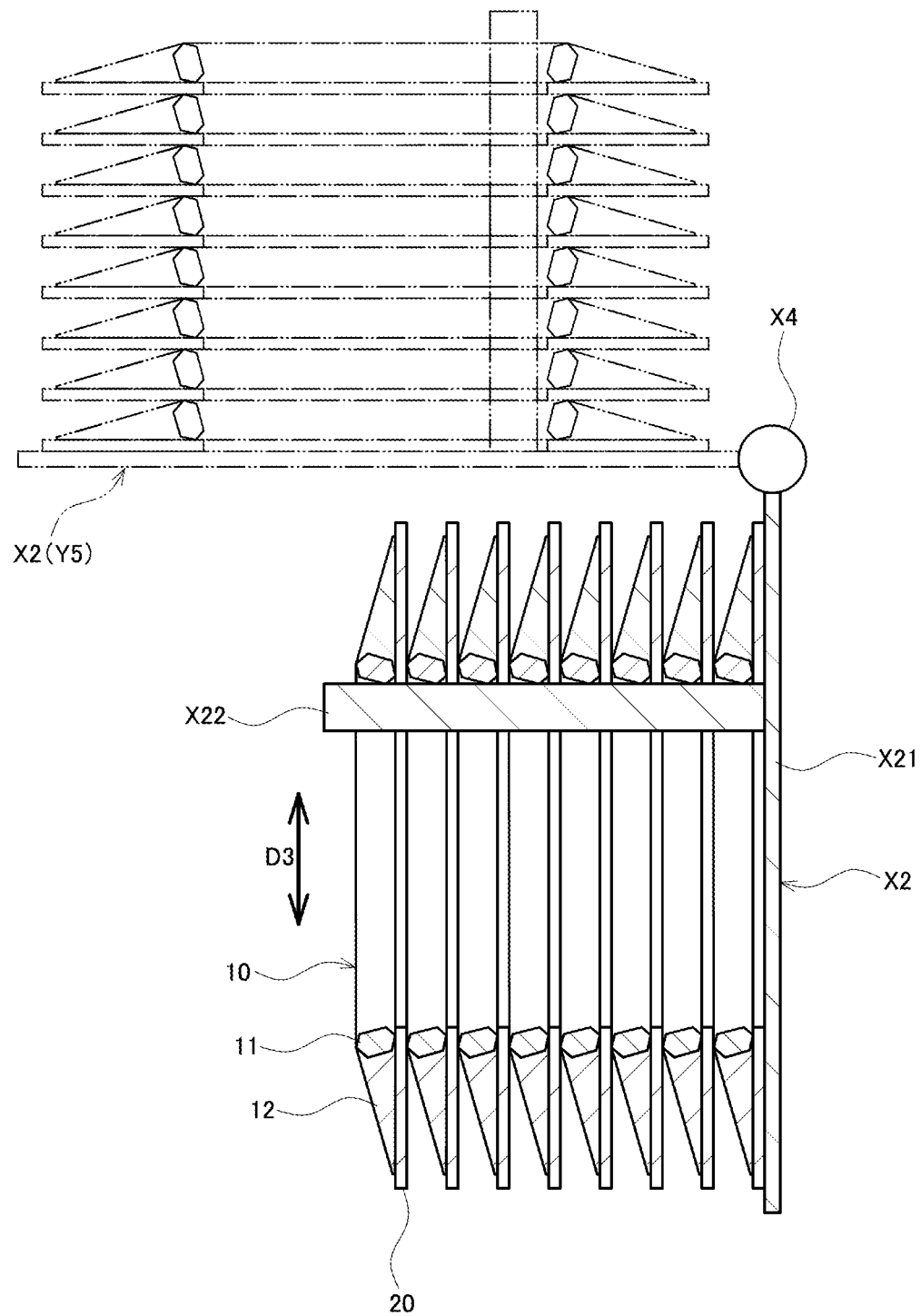
FIG. 7 is a cross-sectional view illustrating an example of a step of erecting the bead members.

As illustrated in FIG. 7, the fourth step erects the bead members 10, which are supported by the separators 20, so that the radial direction D3 of the bead cores 11 goes along the up-and-down direction. That is, the fourth step rotates, by 80 to 100 degrees, the bead members 10 mounted so that the radial direction D3 of the bead cores 11 goes along the horizontal direction. In FIG. 7, the bead members 10 before being rotated are indicated by chain double-dashed lines, and the bead members 10 after being rotated are indicated by solid lines.

In the present embodiment, the bead members 10 are erected (rotated) by rotating means X4 (for example, a motor or the like) in a state of being mounted on the mounting member X2, but are not limited to this. The rotating means X4 is disposed on the mounting member X2 or the conveying device X3 (see FIG. 6), and rotates the mounting member X2 at the rotation position Y5.

In a state of being supported by the separators 20, the bead members 10 erected in the fourth step are transferred to a hanging member (not shown) for storing the bead members 10 and are hung thereby. The bead members 10 are transferred by a robot arm or other transfer means. For example, the hanging member is a rod-shaped member extending in the horizontal direction, and is attached to a transport cart. The bead members 10 are stored in the hanging member while being hung (erected), whereby a larger number of the bead members 10 than in the case of storing the bead members 10 while mounting the same can be stored, and storage efficiency of the bead members 10 can be improved. Moreover, the bead members 10 are stored in the state of being supported by the separators 20, whereby the bead members 10 and 10 adjacent to each other can be prevented from coming into contact with and being attached to each other.

Note that the mounted bead members 10 may be erected by being directly hung on the hanging member by transfer means such as a robot arm. Thus, the bead members 10 can be erected without rotating the mounting member X2 by the rotating means X4.

As above in the present embodiment, the method for manufacturing the pneumatic tire T includes: the first step of pressure-bonding the bead filler 12, which is thinned outward of the bead core 11 in the radial direction D3, to the outer peripheral portion 11a of the bead core 11, and fabricating the annular bead member 10; the second step of causing the separator 20 to support the bead filler 12, and mounting the bead member 10 so that the radial direction D3 of the bead core 11 goes along the horizontal direction; and the third step of cooling the bead member 10.

In accordance with such a method, even if the bead filler 12 is peeled off from the separator 20 due to deformation by heat shrink by the fact that the fabricated bead member 10 is mounted and cooled in a state where the separator 20 is caused to support the bead member 10, the separator 20 can be caused to support the bead filler 12 again by the self weight of the bead filler 12. Thus, the bead filler 12 can be prevented from falling at the time of cooling the bead member 10. Moreover, in comparison with the case of erecting the bead member 10 immediately after fabricating the same, roundness of the bead member 10 can be ensured.

Moreover, as in the present embodiment, preferably, the method for manufacturing the pneumatic tire T is a method in which the first step turns up the bead filler 12 to pressure-bond the same to the bead core 11 by the support member (the filler support member X12) in a state where the support member is caused to support the one side surface portion (the first side surface portion 12b) of the bead filler 12 disposed so that the thickness direction of the bead filler 12 goes along the radial direction D3 of the bead core 11.

In accordance with such a method, the support member (the filler support member X12) is caused to support the one side surface portion (the first side surface portion 12b) of the bead filler 12, whereby the bead filler 12 can be suppressed from being deformed toward the one side surface (the first side surface portion 12b) thereof when the bead filler 12 is turned up. Moreover, the deformation (curling) of the bead filler 12, which is caused when the bead filler 12 is turned up in the first step, can be corrected by the self weight of the bead filler 12.

Moreover, as in the present embodiment, preferably, the method for manufacturing the pneumatic tire T is a method in which the second step stacks and mounts the plurality of bead members 10, which are supported on the separator 20, in the up-and-down direction.

In accordance with such a method, a part (for example, the bottom portion 12a) of the bead filler 12 is pressed against the separator 20 by the self weight of the bead members 10 and the separators 20, which are stacked thereon. Thus, the pasting of the bead filler 12 to the separator 20 can be strengthened, and the bead filler 12 can be suppressed from being deformed due to the heat shrink. Moreover, the bottom portion 12a of the bead filler 12 is pressed by the bead member 10 and the separator 20, which are stacked thereon, whereby the bead filler 12 can be suppressed from being deformed (curled) at the time of being turned up.

Further, as in the present embodiment, preferably, the method for manufacturing the pneumatic tire T includes the fourth step of erecting the bead member 10 supported on the separator 20 so that the radial direction D3 of the bead core 11 goes along the up-and-down direction.

In accordance with such a method, the storage efficiency of the bead member 10 can be improved more than in the state where the bead member 10 is mounted.

Moreover, as in the present embodiment, preferably, the method for manufacturing the pneumatic tire T is a method in which the second step mounts the bead member 10 on the mounting member X2 by inserting the opening portion 10a of the bead member 10 around the columnar member X22 extending along the upper direction from the mounting member X2, the third step cools the bead member 10 in a state of mounting the same on the mounting member X2, and the fourth step erects the bead member 10 by rotating the mounting member X2.

In accordance with such a method, the mounting member X2 that mounts the bead member 10 thereon is rotated, whereby the bead member 10 can be hung on the columnar member X22. Thus, the workability of erecting the bead member 10 can be improved.

Note that the method for manufacturing the pneumatic tire T is not limited to the configuration and method of the embodiment described above and is not limited to the operation and effect described above. Moreover, as a matter of course, the method for manufacturing the pneumatic tire T can be modified in various ways within the scope without departing from the spirit of the present invention.

The transfer, conveyance and rotation of the bead member 10 and the separator 20 in the first step to the fourth step are not limited to those described above, and may be performed by a person.

What is claimed is:

1. A method for manufacturing a pneumatic tire, the method comprising:
   a first step of pressure-bonding a bead filler to an outer peripheral portion of an annular bead core, the bead filler being thinned outward of the bead core in a radial direction, and fabricating an annular bead member;
   a second step of causing a separator to support the bead filler, and mounting the bead member so that the radial direction of the bead core goes along a horizontal direction, wherein the second step includes stacking and mounting a plurality of the bead members on a flat plate member by inserting a columnar member into openings of the plurality of the bead members, the columnar member extending upward from the flat plate member, and each of the plurality of bead members being supported by a respective separator;
   a third step of cooling the bead members in a state of mounting the bead members on the flat plate member; and a fourth step of erecting the bead members by rotating the flat plate member so that the radial direction of the bead core goes along a vertical direction.

2. The method according to claim 1, wherein the first step pressure-bonds the bead core and the bead filler to each other in a state where a temperature difference between a bottom portion and tip end portion of the bead filler is 25° C. or less.

3. The method according to claim 2, wherein the first step pressure-bonds the bead core and the bead filler to each other in a state where a temperature of the tip end portion of the bead filler is 39° C. or more.

4. The method according to claim 1, wherein a height of the bead filler is 80 mm or more.

5. The method according to claim 4, wherein an angle of a tip end portion of the bead filler is 16 degrees or less.

6. The method according to claim 1, wherein, in a state of causing a support member to support one side surface portion of the bead filler disposed so that a thickness direction of the bead filler goes along the radial direction of the bead core, the first step performs turning up for the bead filler to pressure-bond the bead filler to the bead core by the support member.

7. The method according to claim 6, wherein
in the first step, a pressure-bonding device is used, the pressure-bonding device including: a core support member that supports the bead core; and a plurality of filler support members which support the bead filler, and
the turning up is performed by causing the core support member to support the bead core, and by rotating the plurality of filler support members toward the bead core in a state where the plurality of filler support members are caused to support the bead filler.

8. The method according to claim 1, wherein each of the plurality of bead members and the respective separator are alternately mounted and stacked in this order.

9. The method according to claim 1, wherein the first step is a step different from the second step.

10. The method according to claim 1, wherein
the third step of cooling the bead members is performed by natural cooling, and
a cooling time of the bead members is 15 minutes or more.

11. The method according to claim 1, wherein a plurality of flat plate members are arranged on a conveying device that conveys the plurality of flat plate members.

12. The method according to claim 11, wherein a number of the flat plate members arranged on the conveying device is four.

13. The method according to claim 1, wherein a rotation angle of the flat plate member in the fourth step is 80 to 100 degrees.

* * * * *